Jan. 8, 1963 | P. SISKIND | 3,072,858

REDUNDANT AMPLIFIER FAILURE ALARM

Filed July 22, 1959

INVENTOR
PHILIP SISKIND
BY Henry Huff
ATTORNEY

United States Patent Office 3,072,858
Patented Jan. 8, 1963

3,072,858

REDUNDANT AMPLIFIER FAILURE ALARM

Philip Siskind, Great Neck, N.Y., assignor to Sperry Rand Corporation, a corporation of Delaware Filed July 22, 1959, Ser. No. 828,739
1 Claim. (Cl. 330—2)

The present invention relates to dual-path amplifiers and failure detection means therefor.

Many ship steering systems and aircraft control systems employ dual-path redundant amplifiers in order to reduce the possibility of system malfunction in the event of component failure in one of the dual paths of the amplifier.

In the event of a failure of one of the dual amplifications paths, the other amplification path solely will perform the required function of the amplifier and the resultant operation of the amplifier will be substantially unaffected. Since most malfunctions in one path of a redundant amplifier will not appreciably alter the amplifier output, it is desirable to provide means for indicating that a malfunction exists in one of the paths. Thus, the amplifier may be repaired or replaced before a further malfunction occurs which, together with the first-mentioned malfunction, might seriously affect the amplifier operation.

An alarm system for indicating a malfunction in a redundant amplifier is disclosed in U.S. Patent 2,824,296, issued February 18, 1958, in the names of H. Hecht and C. Pottle, and assigned to applicant's assignee. In the redundant amplifier and alarm system disclosed in said patent, a second source of alternating signals at a second frequency different from the frequency of input control signals to be amplified is coupled to each of the dual paths of the redundant amplifier. The relative phase relationships of the signals at the second frequency in the two paths are established for cancellation at the output of the amplifier when both paths are operating properly. In the event of a malfunction in one of the dual paths, the signals at the second frequency no longer will be equal in the two paths and they will not completely cancel at the output of the amplifier, thus generating an error signal. This error signal at the second frequency actuates an alarm, and thus indicates a malfunction in the redundant amplifier. One disadvantage of that failure warning system is that it requires a second source of electrical signals at a frequency different from the given frequency of the input control signals. Another disadvantage of that system is that when a malfunction exists in one of the dual paths, but the amplifier continues to operate by virtue of its redundant feature, a signal at the second frequency will be present in the load which is driven by the amplifier. This signal at the second frequency is not related to the information control signal at the first frequency, the desired signal to be amplified, and will therefore constitute a spurious, undesired signal component in the load. Therefore, when the redundant amplifier is employed in a servo loop of a control system for a ship or an aircraft, the spurious signal at the second frequency may cause a control surface of the craft to be moved to an erroneous position different from position it should assume in response solely to the input control signal. The present invention is an improvement over the failure warning system disclosed in the Hecht et al. patent in that the second source of electrical signals at a second frequency is eliminated. This reduces the complexity and expense of the redundant amplifier, and improves its reliability.

It is therefore an object of the present invention to provide simple failure warning means in a dual-path amplifier.

It is a further object of this invention to provide means for indicating when one path of a dual-path amplifier produces an output signal which is unrelated to the input control signal applied to both of the dual paths.

Another object of this invention is to provide a self-monitoring dual-channel amplifier.

A further object of the invention is to provide an economical and reliable failure warning means for a dual-path amplifier.

These and other objects and advantages of the present invention, which will become more apparent from the description and claim below, are achieved in a dual-path amplifier by providing differential comparing and indicating means coupled between the outputs of the two paths of the amplifier. When both of the dual paths are operating properly, the control signal to be amplified will be equal in both paths of the amplifier and the differential comparing means will produce no signal. An indicator, or alarm, which operates in response to a signal produced by the differential comparing means will not be actuated. If, however, there is a malfunction in one of the dual paths, the signals in the two paths of the amplifier will not be equal and the differential comparing means will produce a signal. This signal then actuates the indicator, or alarm. In one form of the invention the differential comparing means comprises two coils each coupled in a respective amplification path and each coupled to a common load, said coils being wound on a common magnetic core in a manner so as to set up opposing magnetic fields in said core. A third coil is wound on said core in a manner to produce a current whose magnitude is a function of the difference between the flux produced by said first two coils. An indicator means is coupled to the third coil and is actuated by the current induced therein.

The present invention will be explained in connection with the accompanying drawings wherein.

Figure 1:
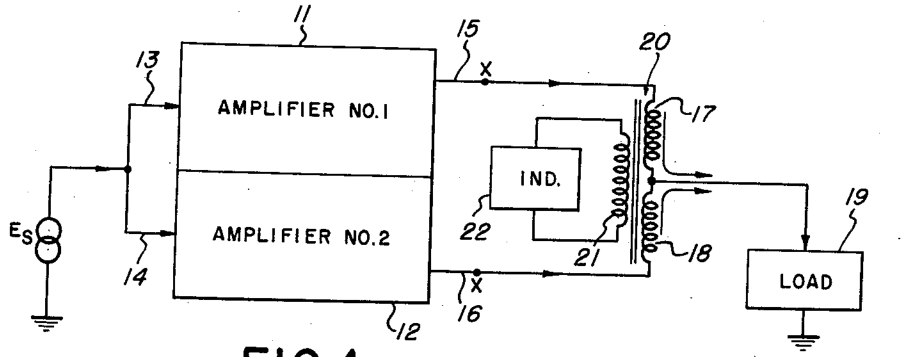
FIG. 1 is a general schematic diagram, partly in block form, illustrating one embodiment of a dual-path amplifier incorporating the self-monitoring failure warning feature of the present invention.

Referring now more particularly to FIG. 1, a dual-path amplifier is comprised of first and second amplifiers 11 and 12 having respective input terminals 13 and 14 parallel coupled to a source of input control signals $E_s$ to be amplified. Output terminals 15 and 16 of amplifiers 11 and 12 are parallel coupled through respective coils 17 and 18 to a common load 19. During normal operation, each of the amplification paths provides one-half of the amplified signal to be coupled to load 19. In the event of a failure or a malfunction in one of said paths, the redundant amplifier will respond in a manner so that the remaining, properly operating amplification path will produce an output signal which compensates for the non-responsive signal from the malfunctioning amplification path. A detailed explanation of one type of a redundant amplifier operating in this manner is described in the above-mentioned patent to Hecht et al.

Coils 17 and 18 comprise primary windings of a differential transformer 20 and are wound on a common core of magnetic material with the secondary winding 21. Coils 17 and 18 are substantially identical and are wound on the core so that equal currents from amplifiers 11 and 12 establish equal and opposite magnetic flux fields in the core of differential transformer 20. When operating in this condition, the resultant magnetic flux in the core of transformer 20 will be substantially zero, and no current will be induced in the secondary winding 21 of said transformer. If, however, one of the amplifiers, amplifier 12 for example, should produce an output signal which is unrelated to the control signal applied at its input terminal, the flux established by the two coils 17 and 18 of transformer 20 will be unequal and a net resultant flux will be established in the core. This flux will induce a current in secondary winding 21 and will actuate an indicating or alarm means 22, thereby indicating a malfunction in one of the dual paths of the amplifier.

Figure 2:
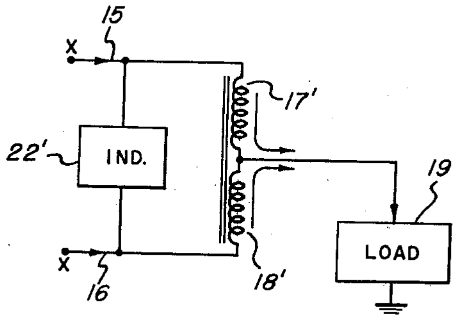
FIG. 2 is a schematic illustration of an alternative differential comparing and indicating means which may be employed in the present invention.

Differential transformer 20 is but one type of a "differential comparing means" which may be employed in the present invention as will be appreciated by those skilled in the art. In this discussion, "differential comparing means" is intended to mean any circuit or apparatus which operates in response to two input signals to produce an output signal which is a function of the difference between the two input signals. As an example, the differential comparing means illustrated in FIG. 2 may be employed in place of the one illustrated in FIG. 1. That is, the circuit of FIG. 2 may be substituted for the circuit to the right of points X—X in FIG. 1. In FIG. 2, indicating means 22′ is directly coupled between the dual amplification paths comprised of amplifiers 11 and 12. When both amplifiers 11 and 12 are operating properly, the voltage drops across coils 17′ and 18′ will be equal and there will be no potential difference between the points X—X. Thus, no current will flow through indicator means 22′. When there is a malfunction in one of the amplifiers 11 or 12, the signals in the two paths will be unequal and there will be a potential difference between the points X—X. In this case, a current will flow through indicator 22′ and an alarm will be actuated.

In FIGS. 1 and 2, the impedances of indicating means 22 and 22′ should be appropriately chosen so that the output signal of the dual-path amplifier is not appreciably affected when the indicator means is actuated. Generally speaking, if the impedances presented by the indicator means 22 and 22′ are approximately equal to the load impedance, the output signal of the dual-path amplifier will not be appreciably affected.

Figure 3:
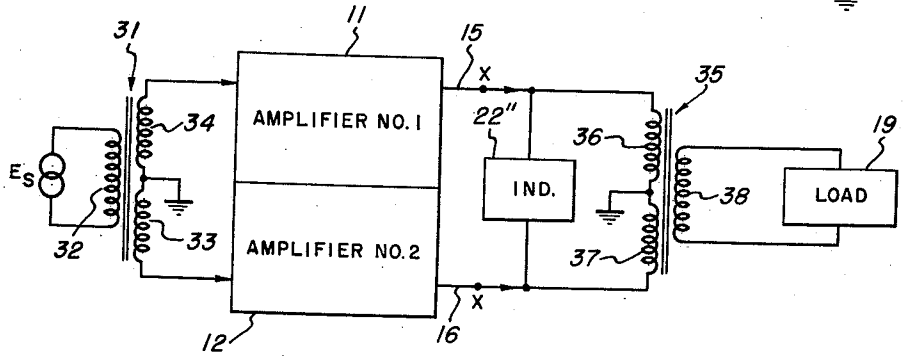
FIG. 3 is a schematic diagram, partly in block form, illustrating a push-pull amplifier incorporating the self-monitoring failure warning feature of the present invention.

The principles of the present invention also may be applied to a dual-path amplifier operating in push-pull. Such an arrangement is illustrated in FIG. 3 wherein substantially identical amplifiers 11 and 12 are coupled to the source $E_s$ of control signals to be amplified by means of transformer 31 having a primary winding 32 and a center-tapped secondary winding comprised of coils 33 and 34. The outputs 15 and 16 of amplifiers 11 and 12 are coupled to load 19 by means of transformer 35 having a center-tapped primary comprised of windings 36 and 37, and a secondary winding 38 coupled to said load 19. For the sake of simplifying the illustration, the direct current connections of the push-pull amplifier of FIG. 3 are omitted. Coupled between the outputs 15 and 16 of amplifiers 11 and 12 is an indicating means 22″ which is responsive only to a direct current signal. In this embodiment of the invention indicator 22″ would be coupled between the plate circuits of the output tubes of amplifiers 11 and 12, in the instance when said amplifiers are comprised of vacuum tube circuits. If both amplifiers 11 and 12 are operating properly in the push-pull mode of operation, the D.C. plate currents of the output tubes of each of said amplifiers will be substantially equal and there would be no voltage potential across indicator 22″. In the event of a malfunction in one of amplifiers 11 or 12, the D.C. plate currents of the respective output tubes of said amplifiers would be different and a voltage potential would exist across indicator 22″. This would give rise to a current flow through indicator 22″ which would actuate the alarm.

Figure 4:
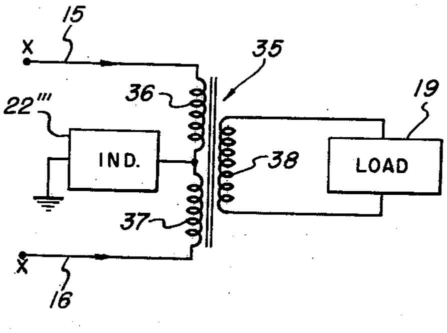
FIG. 4 is a schematic illustration of an alternative embodiment of a failure warning arrangement for a push-pull amplifier.

Another arrangement for providing the self-monitoring feature of the present invention in a push-pull amplifier is illustrated in FIG. 4, which is an alternative output circuit which may be substituted for the output circuit to the right of the points X—X of FIG. 3. In FIG. 4 an indicating means 22‴ is inserted between the center-tap of primary winding of transformer 35 and ground. Indicator 22‴ is responsive only to the fundamental frequency of the signal to be amplified. The connection between the midpoint of the primary winding of transformer 35 and ground does not carry a fundamental frequency component of the signal to be amplified if amplifiers 11 and 12 are operating properly in the push-pull mode of operation. If, however, a malfunction should exist in one of said amplifiers, a fundamental frequency component of the control signal to be amplified would appear between the center-tap of the primary winding of transformer 35 and ground. In this event, indicator means 22‴ would be actuated and would give an alarm that a malfunction exists in one of the amplifiers 11 or 12.

It may be desirable that the indicating means in the above-described embodiments of the invention should not be actuated if a slight permissible unbalance exists between the dual paths, such as might occur in normal operation of the amplifiers. In this event, the indicator means would be constructed so that they would be actuated only by a signal which exceeds a predetermined magnitude.

While the invention has been described in its preferred embodiments, it is to be understood that the words which have been used are words of description rather than of limitation and that changes within the purview of the appended claim may be made without departing from the true scope and spirit of the invention in its broader aspects.

What is claimed is:

A failure detection means for a dual-path amplifier operating to amplify control signals in a craft steering system comprising, (*a*) first and second substantially identical signal amplification means for amplifying input control signals at a given frequency, (*b*) a common source of input control signals at said given frequency coupled to the input of each of said amplification means in a manner to couple said control signals with equal phase and amplitude to said two amplification means, (*c*) a common utilization means coupled to the output of each of said amplification means and operative in response to the combined amplified control signals at said given frequency, and (*d*) differential comparing and indicating means for providing an indication of failure in one of said amplification means, (1) said differential comparing and indicating means being coupled to the respective outputs of said two amplification means and operative in response to signals at said given frequency representing the difference in magnitudes between said control signals at said given frequency as present at the output of said two amplification means, (2) said differential comparing and indicating means comprising substantially identical first and second primary windings each having one end coupled to the output of a respective amplification means and both having their other ends connected together and to a common input of said utilization means, (3) said primary windings being wound on a common core of magnetic material in a manner so that control signal currents of equal magnitude and phase through the two windings establish equal and oppositely directed flux fields in said core, (4) said differential comparing and indicating means further including a secondary winding on said core wound in a manner to be energized by the flux in said core resulting from the difference in magnitudes of the control signals at said given frequency at the outputs of said two amplification means, thereby to produce a current therein at said given frequency that is a function of the difference in magnitudes of said control signals at the respective outputs of said two amplification means, (5) said differential comparing and indicating means further including means coupled to said secondary winding and responsive to said current at said given frequency for providing an indication when the current at said given frequency in said secondary winding exceeds a predetermined magnitude.

References Cited in the file of this patent

UNITED STATES PATENTS

| | | |
|---|---|---|
| 2,285,912 | De Monte | June 9, 1942 |
| 2,605,333 | Job | July 29, 1952 |
| 2,819,400 | Toth | Jan. 7, 1958 |
| 2,824,296 | Hecht et al. | Feb. 18, 1958 |

FOREIGN PATENTS

| | | |
|---|---|---|
| 222,981 | Great Britain | Oct. 16, 1924 |
| 484,287 | Great Britain | May 3, 1938 |